United States Patent
Yokoi et al.

(10) Patent No.: US 8,459,974 B2
(45) Date of Patent: Jun. 11, 2013

(54) SIX-BLADE BIAXIAL ROTARY POSITIVE-DISPLACEMENT PUMP

(75) Inventors: Yasuna Yokoi, Aichi (JP); Akitomo Yokoi, Nagoya (JP); Yoshinobu Ito, Mie (JP); Toshiaki Kato, Aichi (JP); Masafumi Takeda, Nagoya (JP); Kouiti Kume, Nagoya (JP); Hideyuki Okano, Nagoya (JP); Takashi Yokoi, Nagoya (JP)

(73) Assignee: Anlet Co., Ltd., Aichi (JP)

( * ) Notice: Subject to any disclaimer, the term of this patent is extended or adjusted under 35 U.S.C. 154(b) by 230 days.

(21) Appl. No.: 13/095,292

(22) Filed: Apr. 27, 2011

(65) Prior Publication Data

US 2012/0093673 A1    Apr. 19, 2012

(30) Foreign Application Priority Data

Oct. 19, 2010   (JP) ................................ 2010-234245

(51) Int. Cl.
*F03C 2/00* (2006.01)
*F03C 4/00* (2006.01)
*F04C 18/00* (2006.01)

(52) U.S. Cl.
USPC ..... 418/206.5; 418/113; 418/141; 418/206.1; 277/353; 277/403; 277/412

(58) Field of Classification Search
USPC .......... 418/201.1, 201.3, 206.1, 206.5, 206.6, 418/205, 104, 113, 140, 141; 277/353, 403, 277/408, 411, 412, 422
See application file for complete search history.

(56) References Cited

U.S. PATENT DOCUMENTS

| | | | |
|---|---|---|---|
| 2,761,712 A * | 9/1956 | Ecker | 277/403 |
| 3,025,070 A * | 3/1962 | Copes | 277/370 |
| 3,170,408 A * | 2/1965 | Hill et al. | 418/206.6 |
| 4,645,439 A | 2/1987 | Way | |

FOREIGN PATENT DOCUMENTS

| | | | |
|---|---|---|---|
| JP | 54-65808 A | | 5/1979 |
| JP | 62-129589 A | | 6/1987 |
| JP | 06-000498 A | | 1/1994 |
| JP | 06101674 A | * | 4/1994 |
| JP | 08-303355 A | | 11/1996 |
| JP | 2003-056475 A | | 2/2003 |

OTHER PUBLICATIONS

Office Action for Japanese Patent App. No. 2010-0234245 (Oct. 2, 2012).

* cited by examiner

*Primary Examiner* — Theresa Trieu
(74) *Attorney, Agent, or Firm* — Cermak Nakajima LLP; Tomoko Nakajima (57) ABSTRACT

A six-blade biaxial rotary positive-displacement pump includes a casing formed with a suction port and a discharge port, a pair of rotors accommodated in the casing and having rotor shafts rotatably mounted on housings fixed to opposed ends of the casing, respectively. Each rotor is formed with six blades extending radially equiangularly about the rotor shaft. Each blade is formed so as to have a constant thickness in a rotational direction of each rotor. Each blade has an apex and a valley, and a distance between the apex and the valley is set so as to range from three to five times larger than the thickness of each blade.

6 Claims, 11 Drawing Sheets

FIG. 8 GRAPH INDICATIVE OF RESULTS OF PERFORMANCE TEST OF PUMP OF EMBODIMENT

FIG. 9

GRAPH INDICATIVE OF MEASUREMENT RESULTS OF AMOUNT OF DISSOLVED $CO_2$ GAS

FIG. 10
GRAPH INDICATIVE OF MEASUREMENT RESULTS OF AMOUNT OF DISSOLVED $CO_2$ GAS

FIG. 11 GRAPH INDICATIVE OF MEASUREMENT RESULTS OF AMOUNTS OF DISSOLVED $CO_2$ GAS IN PUMP OF THE EMBODIMENT AND COMPARATIVE EXAMPLE

SIX-BLADE BIAXIAL ROTARY POSITIVE-DISPLACEMENT PUMP

CROSS-REFERENCE TO RELATED APPLICATIONS

This application is based upon and claims the benefit of priority from the prior Japanese Patent Application No. 2010-234245 filed on Oct. 19, 2010, the entire contents of which are incorporated herein by reference.

BACKGROUND

1. Technical Field

The present disclosure relates to a six-blade biaxial rotary positive-displacement pump utilizable in recovery equipment for recovering a carbon dioxide ($CO_2$) gas emitted from electric power generating stations, steel plants and the like, and apparatuses for improving water quality of contaminated water in closed water areas such as rivers, lakes or ponds and sewage water discharged from septic tanks.

2. Related Art

Gear pumps and vane pumps have conventionally been used as pumps for transferring fluids such as water, oil, fuels or the like. Japanese Patent Application Publication No. JP-A-S62-129589 discloses a gear pump comprising a housing having a liquid suction port and a liquid discharge port and a pressurizing surface, a pair of gears (spur wheel gears) which are accommodated in a chamber so as to be rotatable while in mesh engagement with the pressurizing surface with a predetermined gap being interposed therebetween, and a device for adjusting the gap between the gears and the pressurizing surface.

On the other hand, Japanese Patent Application Publication No. JP-A-H06-498 discloses a vane pump comprising an annular rotor and a wave rotor both of which are accommodated in a casing so as to be rotatable in a mesh engagement state. The annular rotor has six radial cylinder ports into which plate-shaped pistons are inserted so that vanes loosely inserted into the bottoms are extruded via springs, respectively. A support shaft having two ends fixed to the casing is inserted into the annular rotor in parallel with a rotation axis of the annular rotor. The vanes have respective distal ends which are elastically adjacent to a circumferential surface of the support shaft.

In the above-described conventional gear pump, the housing includes upper and lower housing members and a central adjustable slider plate which is interposed between the upper and lower housing members so as to be slidable. The central adjustable slider plate has first and second enlarged lobes disposed on inner surfaces of the chamber of the slider plate. A pump efficiency is low in the above-described gear pump since spaces defined between the first and second lobes and gears are large. Furthermore, it is disclosed that the aforementioned gap can be adjusted by an adjusting screw without disassembly of the gear pump and replacement of components. However, an adjusting work is troublesome.

In the above-described conventional vane pump, there is sometimes a case where the pistons and/or the vanes sometimes get into the annular rotor thereby not to be smoothly infested. In this case, the fluid flows backward in the pressurizing chamber, whereupon the performance of the pump is reduced.

Additionally, each of the above-described gear and vane pumps has a small capacity per revolution and tends to produce large oscillation or vibration when driven at 1000 rpm or above for the purpose of increasing the capacity.

SUMMARY

Therefore, an object of the disclosure is to provide a six-blade biaxial rotary positive-displacement pump which is small in size but can produce a higher flow rate by increasing a capacity per revolution.

The present disclosure provides a six-blade biaxial rotary positive-displacement pump comprising a casing formed with a suction port and a discharge port, a pair of rotors accommodated in the casing and having rotor shafts rotatably mounted on housings fixed to opposed ends of the casing, respectively, wherein each rotor is formed with six blades extending radially equiangularly about the rotor shaft; each blade is formed so as to have a constant thickness in a rotational direction of each rotor; and each blade has an apex and a valley, and a distance between the apex and the valley is set so as to range from three to five times larger than the thickness of each blade.

The above-described pump is formed into a small structure but can achieve a higher flow rate by increasing a capacity per revolution of the rotor. Accordingly, since the pump can be driven at lower speeds, amounts of noise and oscillation can be reduced and, accordingly, the above-described pump is usable as water pumps, air blowers, wet blowers and the like. Furthermore, when used as a water pump, the above-described pump can achieve no less than 50% suction air relative to an amount of sucked water, whereupon the pump has an advantage that a self-sufficiency performance thereof can be prevented from being reduced.

In an embodiment, each rotor shaft includes a shaft seal part composed into a mechanical seal structure applying a seal to each shaft by contact between a floating sheet fixed to the housing side and a seal ring attached to the rotor shaft, and each rotor shaft is provided with a circular cutter fixed thereto and has a corrugated portion on an outer circumference thereof. The circular cutter is provided so that a gap is defined between an inner peripheral surface of the housing and the corrugated portion of the cutter.

Each shaft seal part is formed into the mechanical seal structure applying a seal to each shaft by contacting portions of a floating sheet and a seal ring with each other. Consequently, even if impurity such as fiber etc. contained in the sucked fluid invades the housing, the impurity is cut into pieces by the circular cutters and returned into the casing by suction at the lower pressure side thereby to be discharged with the fluid. The pump provided with the shaft seal part is suitable as a water pump in which the fluid is a liquid.

In another embodiment, each rotor shaft includes a shaft seal part composed into an oil seal structure applying a seal to each shaft by contact between an inner edge of an oil seal fixed to the housing side and an outer circumferential surface of sleeve attached to each rotor shaft, and vice versa. Each rotor shaft is provided with a circular cutter fixed thereto and has a corrugated portion on an outer circumference thereof. The circular cutter is provided so that a gap is defined between an inner peripheral surface of the housing and the corrugated portion of the cutter.

Each shaft seal part is formed into the oil seal structure applying a seal to each shaft by contacting the inner edge of the oil seal and a seal ring with each other. Consequently, even if impurity such as trash etc. contained in the sucked fluid invades the housing, the impurity is cut into pieces by the circular cutter and returned into the casing by suction at the lower pressure side thereby to be discharged with the fluid.

The pump provided with the shaft seal part is suitable as a water pump in which the fluid is a liquid.

In further another embodiment, the casing and the rotors are disposed so that an imaginary line extending between rotation centers of the rotor shafts is set to any one of a vertical line, a horizontal line and a line inclined by a predetermined angle.

Consequently, the pump can be designed in accordance with various usages since the locations of the suction port and the discharge port can be changed by the disposition of the rotor.

DETAILED DESCRIPTION

Figure 1:
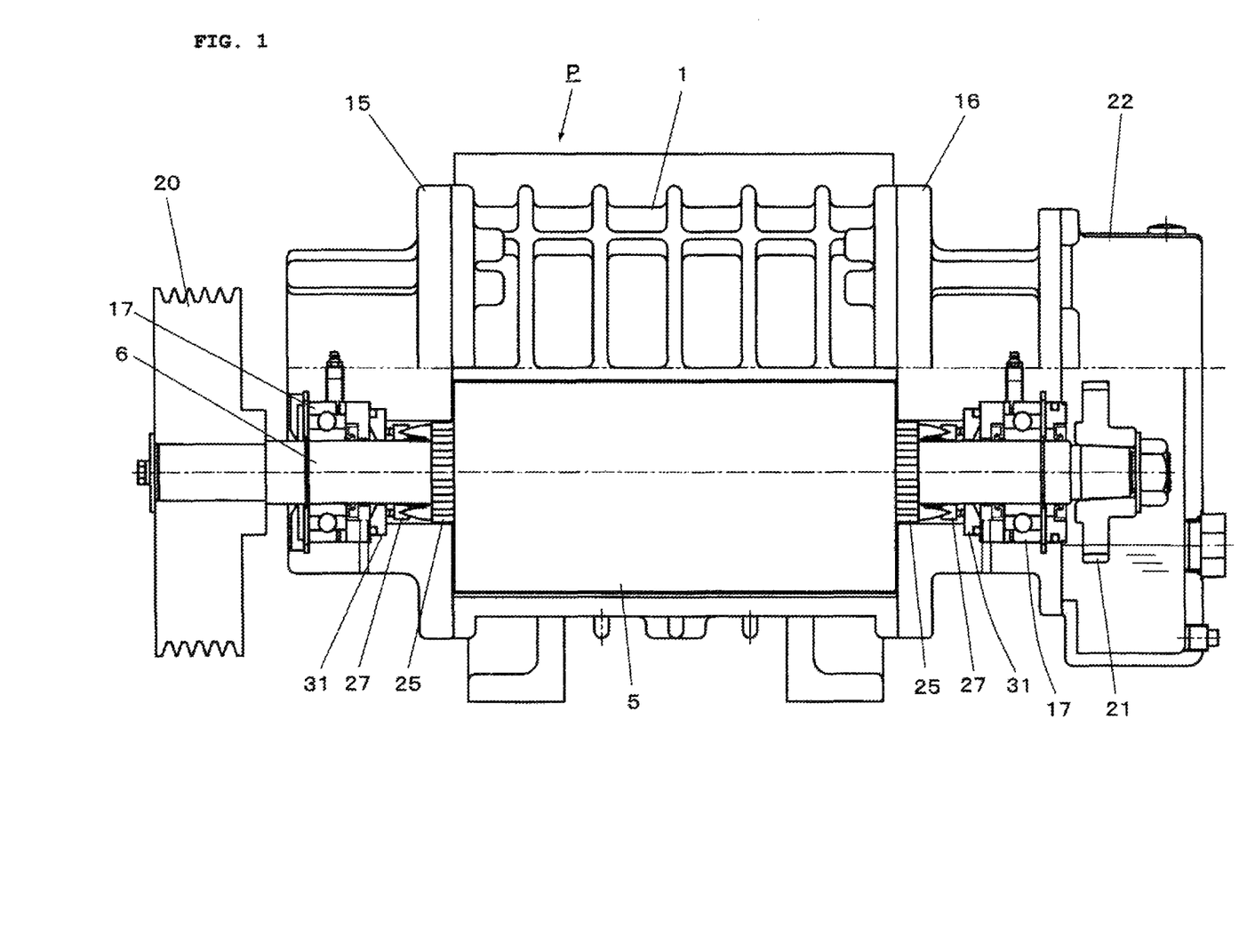
FIG. 1 is a front view of the six-blade biaxial rotary positive-displacement pump of an embodiment.
Figure 2:
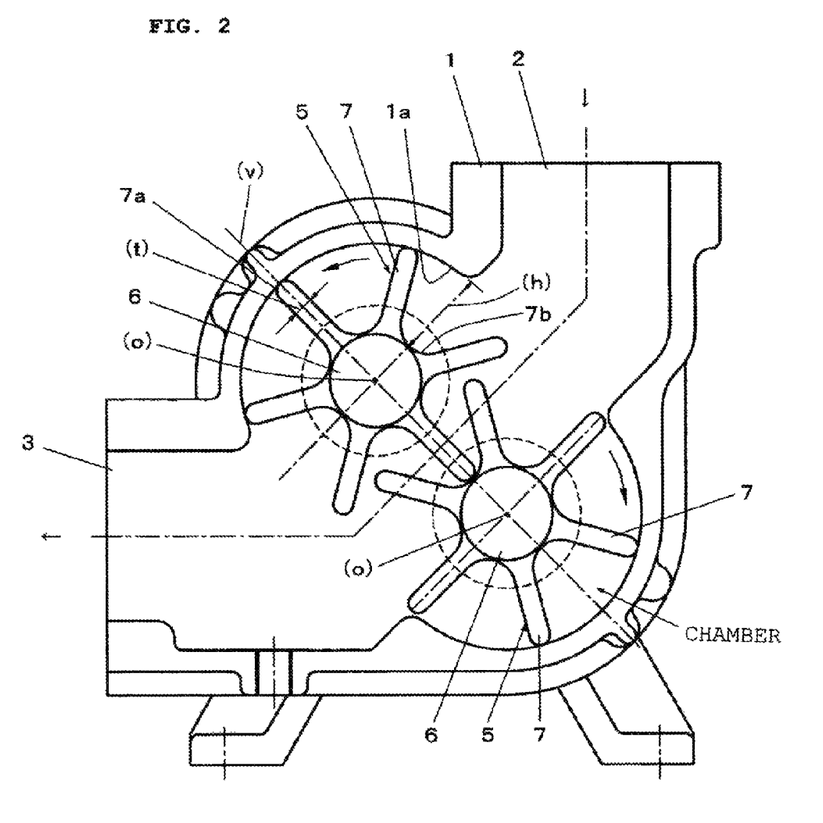
FIG. 2 is a side view of the pump.
Figures 3A, 3B:
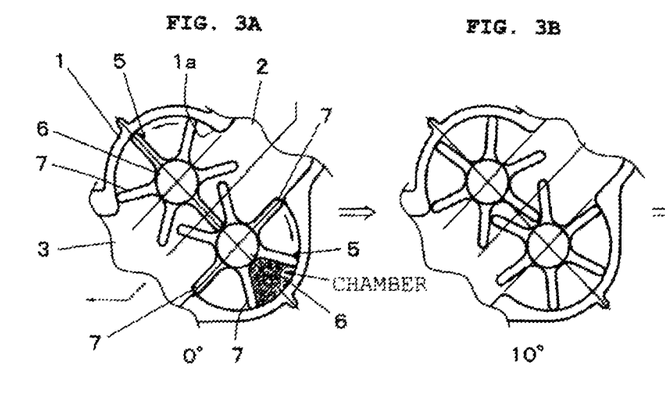
FIGS. 3A to 3G show continuously changed rotation angles of the rotor.
Figure 3C:
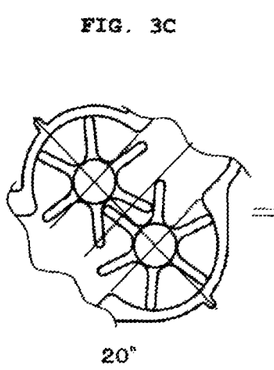
Figure 3D:
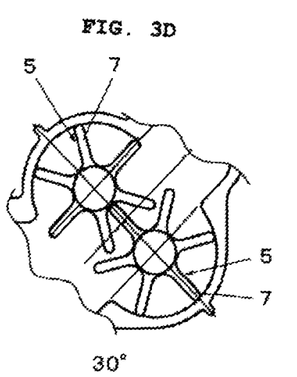
Figure 3E:
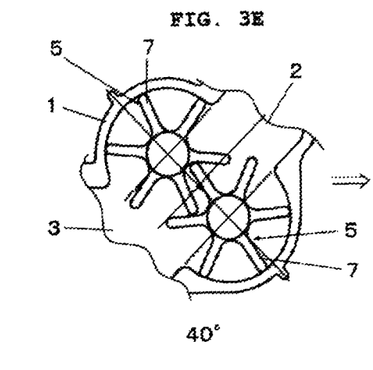
Figure 3F:
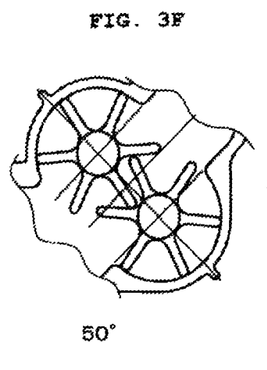
Figure 3G:
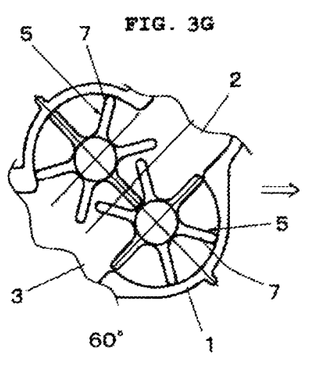

One embodiment will now be described with reference to the accompanying drawings. A six-blade biaxial rotary positive-displacement pump p of the embodiment includes a casing 1 having a suction port 2 and a discharge port 3, a pair of rotors 5 accommodated in the casing 1 and having rotor shafts 6 rotatably mounted on bearings 17 further mounted on housings 15 and 16 fixed to both sides of the casing 1, respectively. A pulley 20 is mounted on the lower rotor shaft 6 protruding out of the housing 15. The rotor shaft 6 is adapted to be rotated by an electric motor (not shown). Timing gears 21 are fixed to the rotor shafts 6 protruding out of the housing 16 so as to be brought into mesh engagement with each other, respectively. A gear cover 22 is mounted on an outer end surface of the housing 16.

The casing 1 and the rotors 5 are disposed so that an imaginary line v extending between centers of rotation of the rotor shafts 6 is inclined at a predetermined angle, for example, at an angle of 45° in the embodiment, as shown in FIG. 2. The imaginary line v should not be limited to the above setting. More specifically, since the pump p is capable of coping with various installation conditions by changing the locations of the suction port 2 and the discharge port 3 thereof, the imaginary line v may be a vertical line or a horizontal line other than the inclined line.

Each rotor 5 has six blades 7 which are integrally formed therewith so as to extend radially equiangularly or at intervals of 60° about the rotor shaft 6. Each blade 7 is formed so as to have a constant thickness t in a rotational direction of each rotor 5. Furthermore, each blade 7 has a curved convex apex 7a and a curved concave valley 7b, and a distance h between the apex 7a and the valley 7b is set so as to range from three to five times larger than the thickness t of each blade 7. A clearance is defined between each apex 7a and an inner surface 1a of the casing 1 and is set to about 0.3 mm. The rotors 5 are configured to be rotated in directions opposite to each other with the aforementioned clearance being maintained.

FIGS. 3A to 3G show the rotors 5 whose rotation angles are changed continuously every 10°. Three chambers are defined by up to four blades 7 simultaneously closed and the inner surface 1a of the casing 1 between the suction port side and the discharge port side. This results in a smaller amount of fluid leakage between the chambers. Consequently, the pump p of the embodiment has a higher efficiency than conventional Roots pumps.

In FIG. 2, a distance of up to about 1 mm is secured between the apex 7a of each blade 7 of one rotor 5 and the valley 7b of each blade 7 of the other rotor 5. The positions of the rotors 5 as shown in FIGS. 3A, 3B, 3E and 3F results in occurrence of fluid confinement. Negative pressure due to suction results in a local vacuum state in the rear of each blade 7 in a rotational direction. The local vacuum state repeats a mixing action between a gas and water, resulting in microscopic bubbles. Additionally, although the local vacuum state produces cavitation, the pump p in accordance with the present invention produces smaller cavitation sound and smaller oscillation than two-bladed rotary pumps.

Furthermore, since a chamber defined by closure of the inner surface 1a of the casing 1 by the apexes 7a of two adjacent blades 7 has a larger volume, a capacity per rotation of each rotor 5 can be increased, with the result that a larger flow rate can be achieved even when the pump p is smaller in size. The following TABLE 1 shows approximate capacities per revolution of several types of rotors which have the same interaxial dimension and the same external dimensions:

TABLE 1

| Side geometry of rotor blades | Capacity (by lit.) per revolution of rotor |
| --- | --- |
| Six-blade linear type of the embodiment | 8.9 |
| Six-blade envelope type | 4.6 |
| Six-blade involuted type | 5.2 |
| Three-blade envelope type | 6.0 |
| Three-blade involuted type | 6.9 |
| Two-blade envelope type | 6.3 |
| Two-blade involuted type | 7.2 |

Either a mechanical seal structure or an oil seal structure is employed for a shaft seal part of each rotor shaft 6. The mechanical seal structure is suitable for a case where the fluid is mainly a liquid, whereas the oil seal structure is suitable for a case where the fluid is mainly a gas.

Each seal structure will now be described.

Figure 4:
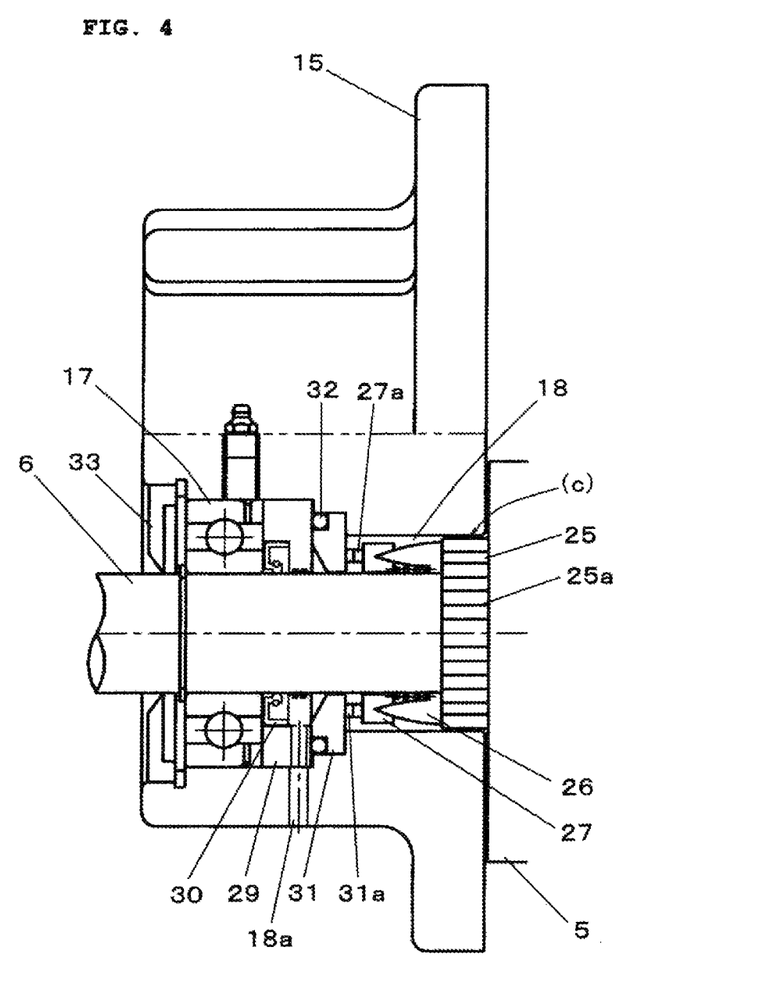
FIG. 4 shows a shaft seal part of the mechanical seal structure.

1. Mechanical Seal Structure:

Referring to FIG. 4, each rotor shaft 6 has a circular cutter 25 fixed thereto. The circular cutter 25 has corrugated portions 25a formed continuously in parallel with an outer circumference of the shaft 6. The cutter 25 is fixed so that a slight gap c is defined between an inner circumference of the housing 18 communicating with the housing 1 and the corrugated portions 25a. A shock-absorbing rubber 26 made from urethane and a seal ring 27 are attached closely to an end face of the circular cutter 25 in turn. A metal seal 27a is provided on a circumferential end face of the seal ring 27. A collar 29 is fitted with the rotor shaft 6 so as to be located along the outer ring side of the bearing 17. The collar 29 has an oil seal 30 attached to an inner circumference thereof. A floating sheet 31 is fitted with the rotor shaft 6 so as to be located at the back of the collar 29. A metal seal 31a is provided on an end surface of the floating sheet 31. An O-ring 32 is attached to a stepped portion of the floating sheet 31 so as to adhere closely to the collar 29. A dust seal 33 is attached to the housing 15 so as to be located outside the bearing 17. A drain hole 18a is provided for discharging therethrough fluid having collected in the housing 18.

Thus, the floating sheet 31 fixed to the housing 15 side has a portion opposed to a portion of the seal ring 27 attached to the rotor shaft 6. A mechanical seal structure comprises opposed portions of the floating sheet 31 and the seal ring 27, that is, seals 31a and 27a. The mechanical seal structure provides a shaft seal by contacting the seals 31a and 27a with each other. Another shaft seal of the similar mechanical seal structure is also adapted to be applied to the housing 16 side.

Figure 5:
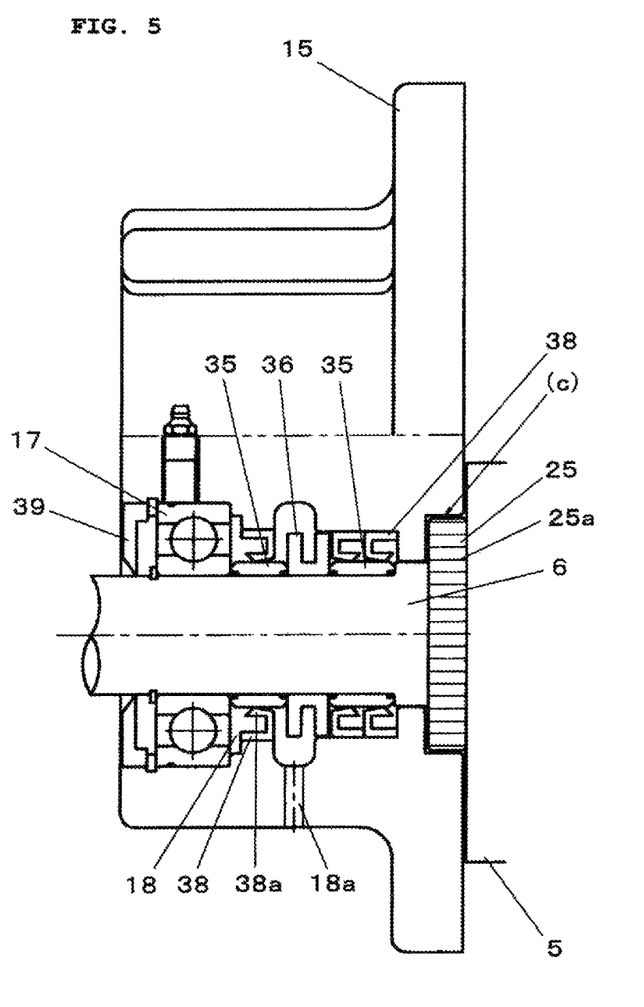
FIG. 5 shows a shaft seal part of the oil seal structure.

2. Oil Seal Structure:

Referring to FIG. 5, two sleeves 35 are attached to the rotor shaft 6 so as to be located in front of and in the rear of a centrifugal shaking ring 36 respectively, whereby the ring 36 is interposed between the sleeves 35. The ring 36 is provided for centrifugally shaking off water or the like invading the housing 18 from the casing 1. Two oil seals 38 are fixed to the front sleeve 35 at the housing 16 side, whereas one oil seal 38 is fixed to the rear sleeve 35. A dust seal 39 is attached to the housing 15 so as to be located outside the bearing 17. A drain hole 18a is provided for discharging therethrough a fluid collected in the housing chamber 18. Since the circular cutters 25 are fixed to the rotor shaft 6 in the same manner as in the mechanical seal structure, the description of the circular cutters 25 will be eliminated. Thus, an oil seal structure applying seal to the rotor shaft 6 comprises an inner edge 38a of the oil seal 38 fixed to the housing 15 side and an outer circumference of the sleeve 35 attached to the rotor shaft 6. The inner edge 38a of the oil seal 38 and the outer circumference of the sleeve 35 are brought into contact with each other, so that the oil seal structure is provided. The same oil seal structure is also provided at the housing 16 side. The six-blade biaxial rotary positive-displacement pump p of the embodiment constructed as described above sucks the fluid from the suction port 2 by the rotation of the rotors 5 and compresses the fluid, which is then discharged through the discharge port 3.

Figure 6:
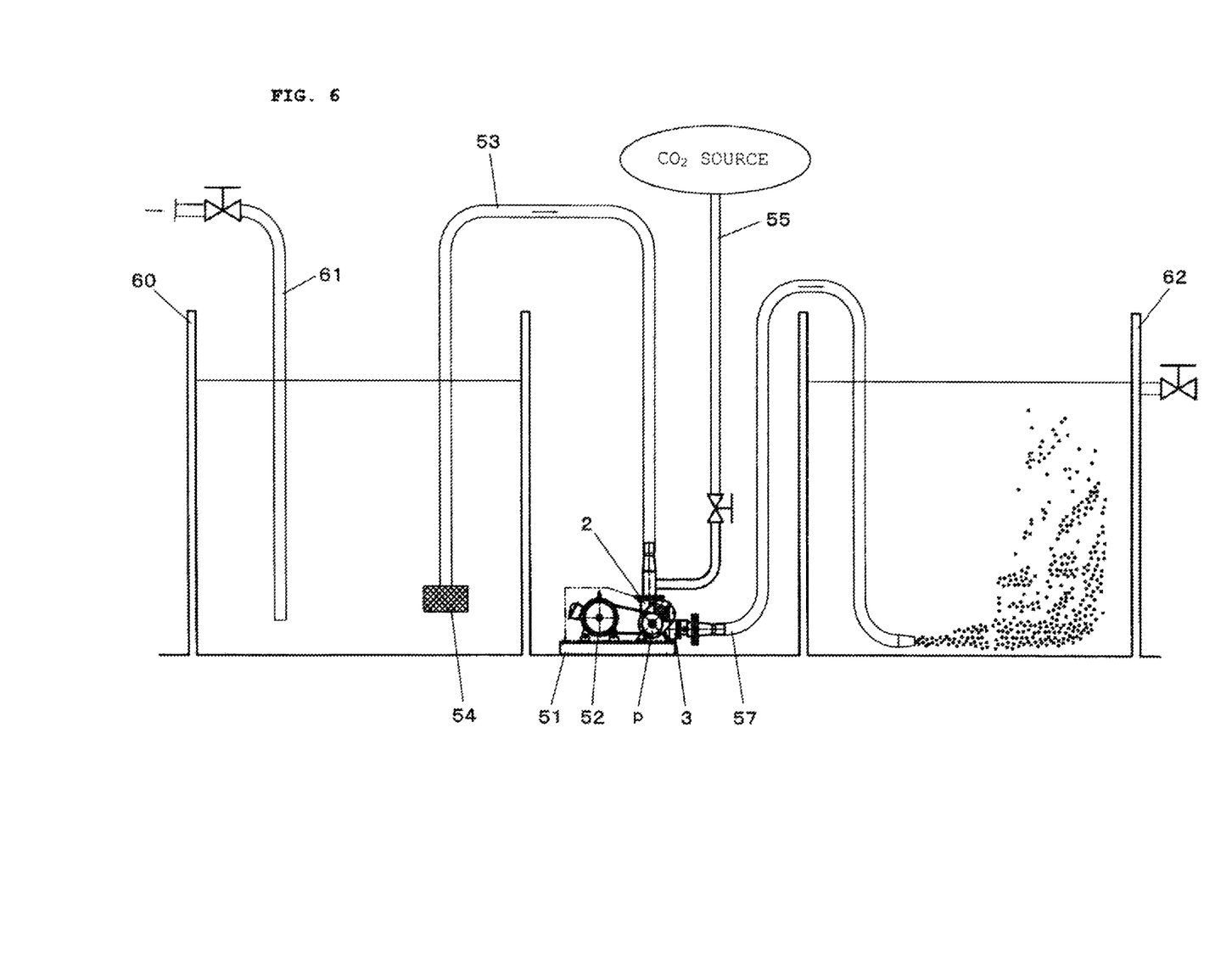
FIG. 6 shows an example of the pump of the embodiment.

Application of the Pump:

Several applications of the pump p will now be described with reference to FIGS. 6 and 7. FIG. 6 shows $CO_2$ gas-recovery equipment to which the pump p is applied. The $CO_2$ gas-recovery equipment is used to mix a carbon dioxide ($CO_2$) gas discharged from a power plant or the like with water sucked by the pump p, whereby the $CO_2$ gas is dissolved into the water thereby to be recovered. The pump p of the embodiment and an electric motor 52 for driving the pump p are installed on a base 51. A suction pipe 53 having a distal end to which a strainer 54 is mounted is connected to the suction port 2 of the pump p. A discharge pipe 57 is connected to the discharge port 3. To the suction pipe 53 is connected an air guide pipe through which outside air is introduced. A first water tank 60 is provided for collecting water supplied through a supply pipe 61. A second water tank 62 is provided for dissolving a $CO_2$ gas in water.

Figure 7:
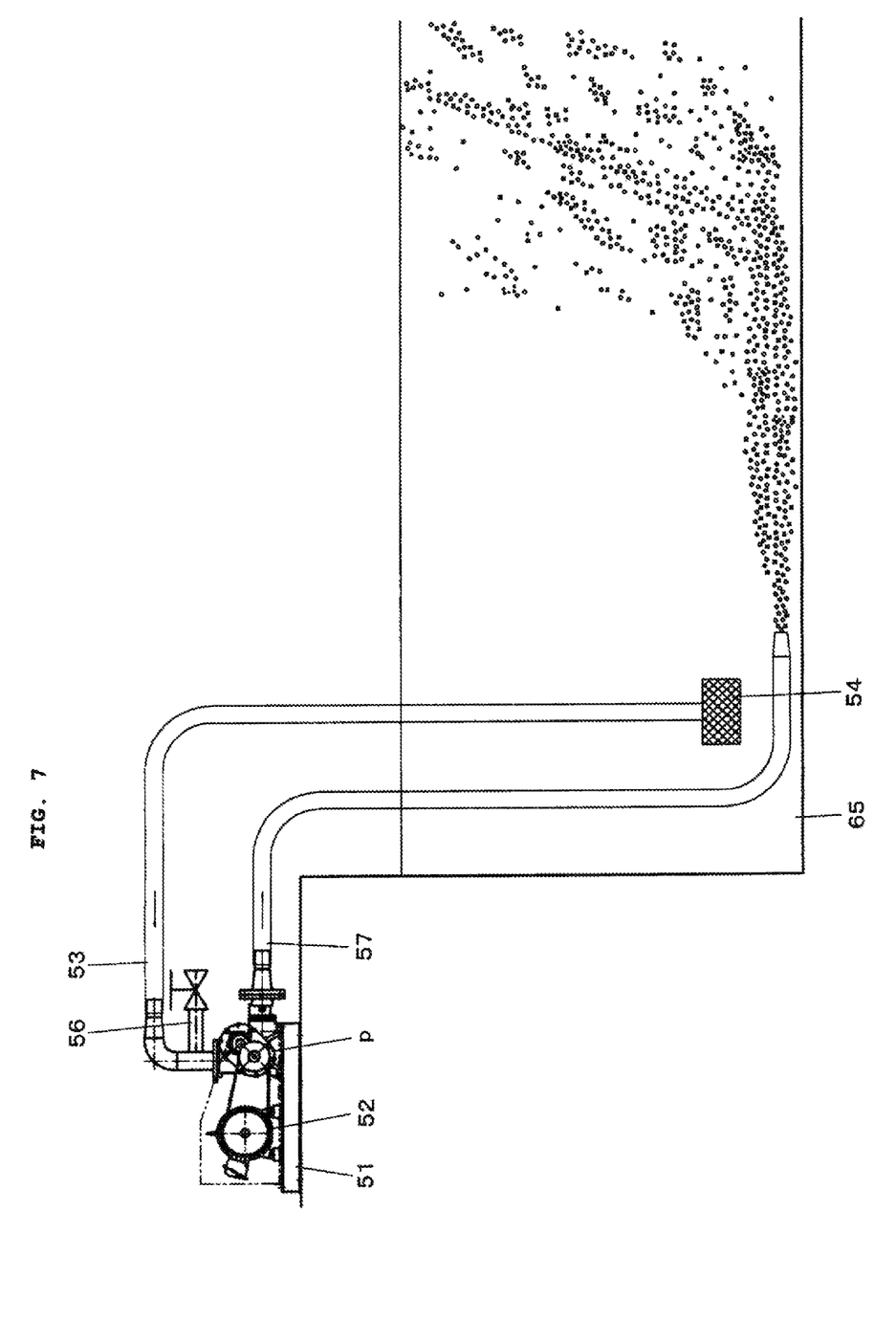
FIG. 7 shows another example of the pump.

FIG. 7 shows a microscopic bubble generating apparatus as another application of the pump p. The microscopic bubble generating apparatus is used to blow microscopic bubbles into contaminated water particularly in a closed water area such as rivers, lakes, ponds or the like thereby to improve water quality. The microscopic bubble generating apparatus has substantially the same construction as the above-described $CO_2$ gas-recovery equipment and accordingly, identical or similar components are labeled by the same reference symbols. An air guide pipe 56 through which outside air is introduced is connected to the suction pipe 53. Reference numeral 65 designates a closed water area such a river, a lake or a pond.

In the pump p of the embodiment, water and a $CO_2$ gas or air are simultaneously sucked in such that negative pressure due to suction results in a local vacuum state in the rear of each blade 7 in a rotational direction and such that bubbles instantaneously trapped in the chamber is rendered microscopic by the pressure at the discharge side. An experiment conducted by the inventors confirms that when the pump of the embodiment was applied to the microscopic bubble generating apparatus, the $CO_2$ gas or air discharged from the pump to be dissolved into water was changed into microscopic bubbles, with the result that the microscopic bubbles were not diffused for a long period of time.

Experiment 1

Figure 8:
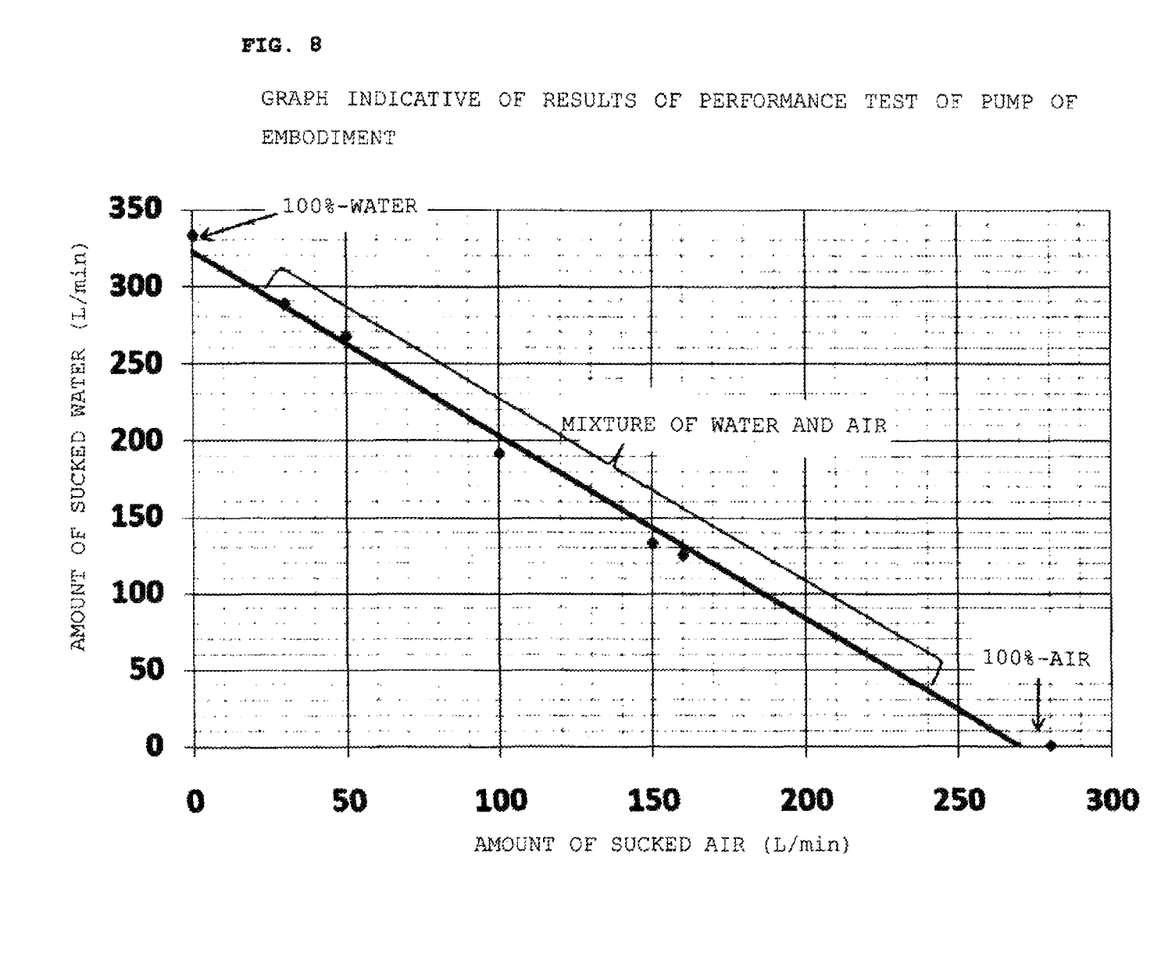
FIG. 8 is a graph showing the results of performance test of the pump of the embodiment.

A suction performance test was conducted in the range from 100%-water to 100%-air, and FIG. 8 shows the results of the test.

Experimental conditions:
The pump of the embodiment
Bore: 50 mm
Rotational speed: 450 rpm
Output power: 1.5 Kw The experiment confirms that the pump could be stably operated without occurrence of cavitation in the whole range from 100%-water to 100%-air.

Experiment 2

Figure 9:
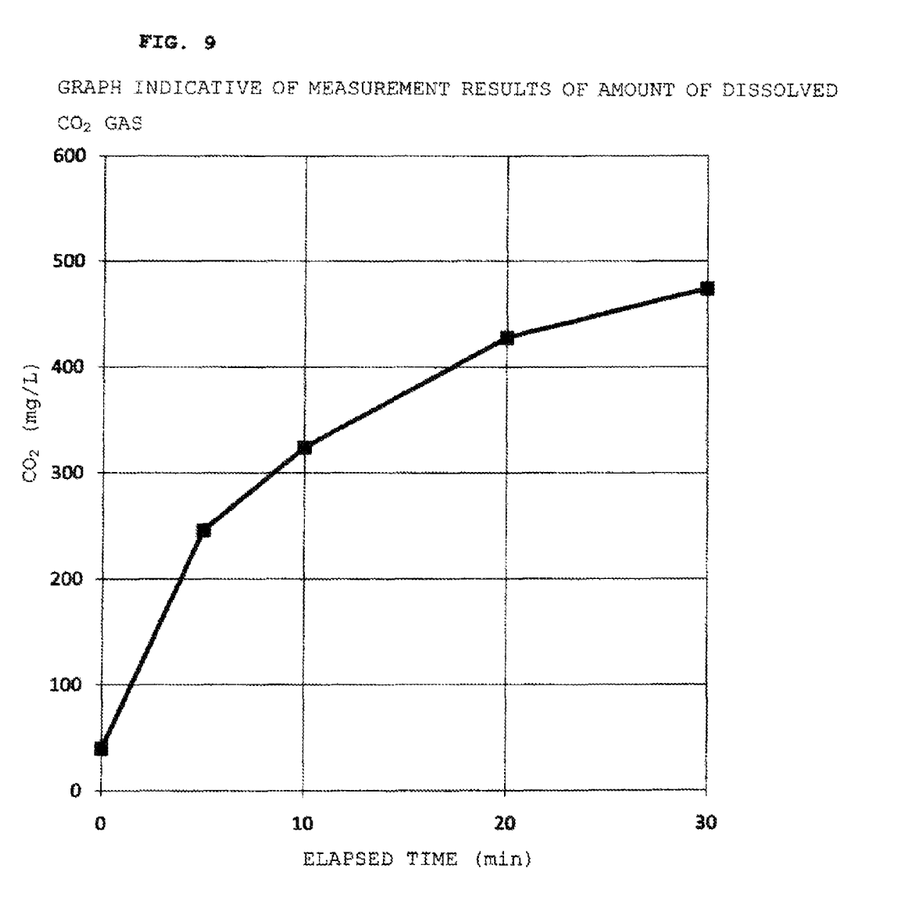
FIG. 9 is a graph showing the results of measurement of a dissolved $CO_2$ amount.

The water sucked in by the pump of the embodiment was mixed with 30%-$CO_2$ gas. An amount of dissolved $CO_2$ gas was measured after discharge from the discharge port of the pump into the water. FIG. 9 shows the measurement results.

Figure 10:
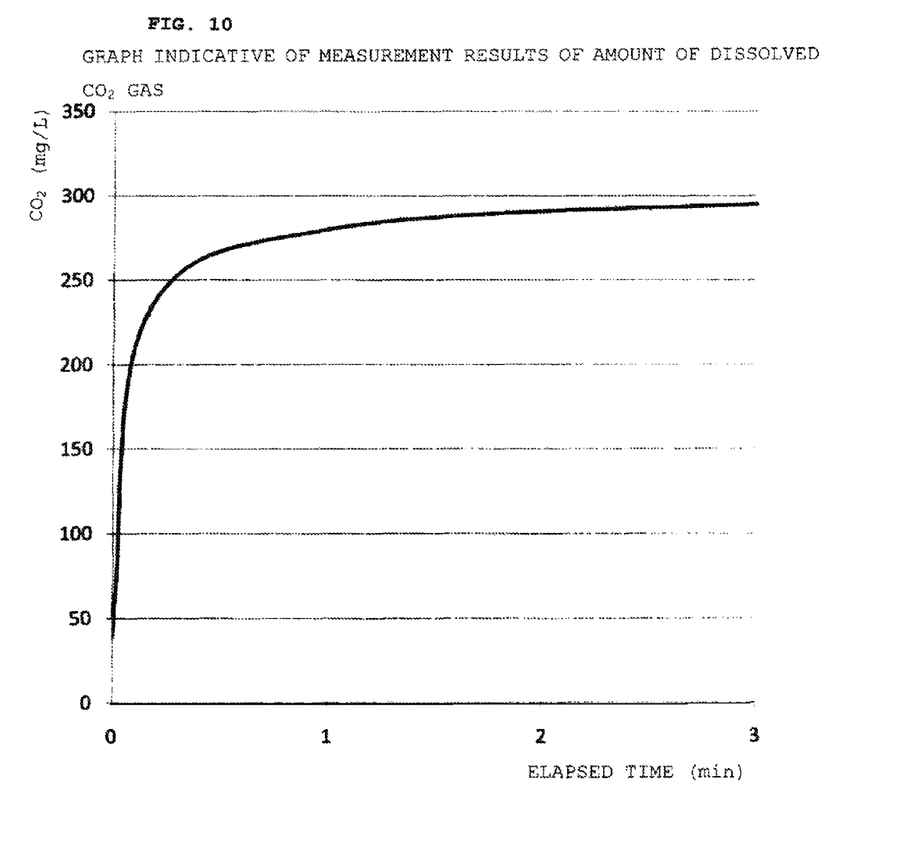
FIG. 10 is also another graph showing the results of another measurement of a dissolved $CO_2$ amount.

Furthermore, discharged water is collected immediately behind the discharge port of the pump, and an instantaneous value of an amount of $CO_2$ gas dissolved in water was measured. FIG. 10 shows the measurement results.

Experimental conditions:
The pump of the embodiment
Bore: 50 mm
Rotational speed: 250 rpm
Motor
Output power: 0.75 Kw
Amount of sucked water: 200 lit. per minute
Amount of sucked $CO_2$ gas: 20 lit. per minute
Amount of sucked air: 47 lit. per minute
Capacity of water tank: 950 lit.
Water temperature: 30° C.

The experimental results confirm that an amount of dissolved $CO_2$ gas was increased to about 480 mg/L after lapse of 30 minutes such that the $CO_2$ gas was dissolved in water. Furthermore, it is confirmed that an instantaneous value of $CO_2$ gas amount was increased to about 230 mg/L after lapse of ten seconds and to about 270 mg/L after lapse of 30 seconds and thereafter varied to a smaller degree with the result that a large amount of $CO_2$ gas dissolved into water for a short period of time.

Experiment 3

Figure 11:
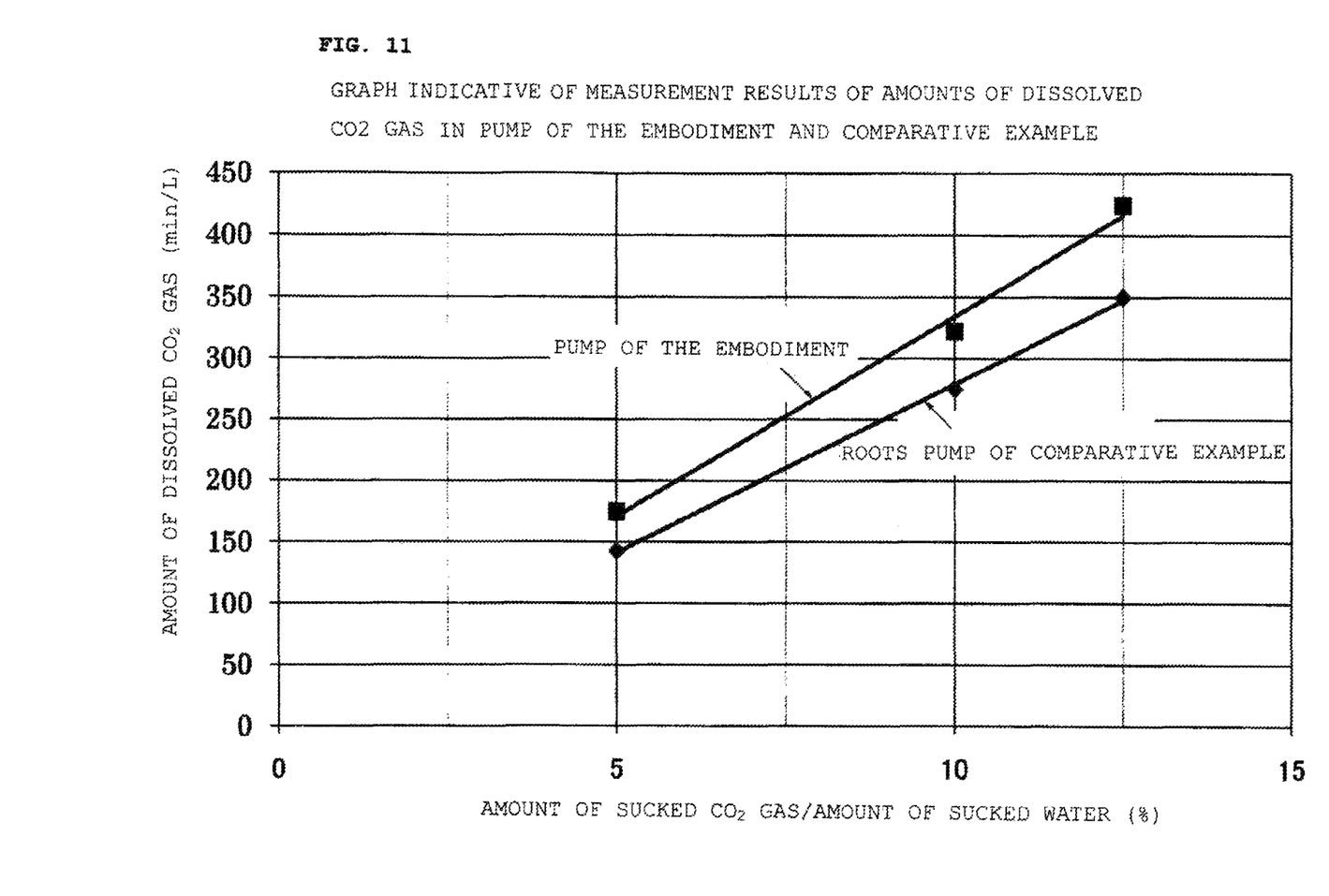
FIG. 11 is a graph showing the results of measurement of dissolved $CO_2$ amounts compared between the embodiment and a comparative example.

Regarding the pump of the embodiment and a two-blade Roots pump of a comparative example, an experiment was conducted to compare amounts of dissolved $CO_2$ gas measured immediately behind the discharge port of the pump with each other while a mixing ratio of amounts of water and $CO_2$ gas was changed. FIG. 11 shows the experimental results.

Experimental conditions:
The pump of the embodiment
Bore: 50 mm

Rotational speed: 250 rpm

Motor

Output power: 0.75 Kw

Two-blade Roots pump

Bore: 50 mm

Rotational speed: 700 rpm

Motor

Output power: 1.5 Kw

The experimental results confirm that the pump of the embodiment dissolved a larger amount of $CO_2$ gas than the Roots pump of the comparative example. This is considered to result from the fact that the pump of the embodiment mixed water and $CO_2$ at a larger number of times than the Roots pump of the comparative example.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. A six-blade biaxial rotary positive-displacement pump comprising:

a casing formed with a suction port and a discharge port, a pair of rotors accommodated in the casing and having rotor shafts rotatably mounted on housings fixed to opposed ends of the casing, respectively, wherein:

each rotor is formed with six blades extending radially equiangularly about the rotor shaft;

each blade is formed so as to have a constant thickness in a rotational direction of each rotor; and each blade has a curved convex apex and a curved concave valley between an adjacent blade, and a distance between the apex and the valley is set so as to range from three to five times larger than the thickness of each blade, and three chambers are defined by up to four blades simultaneously closed and the inner surface of the casing between the suction port side and the discharge port side.

2. The pump according to claim 1, wherein each rotor shaft includes a shaft seal part composed into a mechanical seal structure applying a seal to each shaft by contact between a floating sheet fixed to a housing side and a seal ring attached to each rotor shaft, and each rotor shaft is provided with a circular cutter fixed thereto and having a corrugated portion on an outer circumference thereof, the circular cutter being provided so that a gap is defined between an inner peripheral surface of the housing and the corrugated portion of the cutter.

3. The pump according to claim 2, wherein the casing and the rotors are disposed so that an imaginary line extending between rotation centers of the rotor shafts is set to any one of a vertical line, a horizontal line and a line inclined by a predetermined angle.

4. The pump according to claim 1, wherein each rotor shaft includes a shaft seal part composed into an oil seal structure applying a seal to each shaft by contact between an inner edge of an oil seal fixed to a housing side and an outer circumferential surface of sleeve attached to each rotor shaft, and each rotor shaft is provided with a circular cutter fixed thereto and having a corrugated portion on an outer circumference thereof, the circular cutter being provided so that a gap is defined between an inner peripheral surface of the housing and the corrugated portion of the cutter.

5. The pump according to claim 4, wherein the casing and the rotors are disposed so that an imaginary line extending between rotation centers of the rotor shafts is set to any one of a vertical line, a horizontal line and a line inclined by a predetermined angle.

6. The pump according to claim 1, wherein the casing and the rotors are disposed so that an imaginary line extending between rotation centers of the rotor shafts is set to any one of a vertical line, a horizontal line and a line inclined by a predetermined angle.

* * * * *